United States Patent
Horie et al.

[11] Patent Number: 6,078,163
[45] Date of Patent: Jun. 20, 2000

[54] BATTERY TEMPERATURE INCREASING DEVICE AND METHOD

[75] Inventors: Hideaki Horie, Yokosuka; Toyoaki Nakagawa, Chigasaki; Mikio Kawai, Yokosuka; Yuji Tanjo, Yokohama; Takaaki Abe; Ken Iwai, both of Yokosuka, all of Japan

[73] Assignee: Nissan Motor Co., Ltd., Yokohama, Japan

[21] Appl. No.: 09/311,882

[22] Filed: May 14, 1999

[30] Foreign Application Priority Data

May 14, 1998 [JP] Japan .................................. 10-132182

[51] Int. Cl.[7] .......................... H01M 10/44; H01M 10/46
[52] U.S. Cl. ............................ 320/104; 320/134; 320/150
[58] Field of Search .................................... 320/104, 134, 320/136, 142, 144, 150, FOR 134, FOR 142; 323/355, 364, 371

[56] References Cited

U.S. PATENT DOCUMENTS 3,764,926  10/1973  Rypinski, Jr. .
4,220,906   9/1980  Drummond .

*Primary Examiner*—Edward H. Tso
*Attorney, Agent, or Firm*—Foley & Lardner

[57] ABSTRACT

An inductor (L), capacitor (C) and alternator (OSC) are connected in series to the positive and negative poles of a battery (15). The temperature of the battery (15) is increased by causing the alternator (OSC) to generate an alternating current having the resonance frequency of the inductor (L) and capacitor (C). The alternating current is consumed by the internal resistance of the battery (15) due to the resonance of the inductor (L) and capacitor (C), and the temperature of the battery (15) therefore rises due to the heat thereby generated in the battery. In this way, the temperature of the battery (15) can be effectively increased with minimum power consumption.

6 Claims, 4 Drawing Sheets

BATTERY TEMPERATURE INCREASING DEVICE AND METHOD

FIELD OF THE INVENTION

This invention relates to temperature increasing of a battery.

BACKGROUND OF THE INVENTION

When the temperature of a battery is low, the internal resistance of the battery is large and the output is low.

In order to obtain a predetermined output in a low temperature environment, the temperature of the battery must be increased.

In this context, it is known that coercively causing the battery to discharge increases the battery temperature by electrical discharge energy.

SUMMARY OF THE INVENTION

However, such a coercive electric discharge causes mass consumption of battery power.

It is therefore an object of this invention to increase the temperature of a battery efficiently with low power consumption.

In order to achieve the above objects, this invention provides a temperature increasing device for increasing the temperature of a battery comprising a positive and negative pole, and plural cells connected in series. The device comprises a circuit comprising an inductor, capacitor and alternating current power supply connected in series between the two poles, and a microprocessor programmed to control the alternating current power supply so that an alternating current having a resonance frequency of the inductor and capacitor is generated by the power supply.

This invention also provides a temperature increasing method for increasing the temperature of a battery comprising a positive and negative pole, and plural cells connected in series. The method comprises connecting a circuit comprising an inductor, capacitor and alternating current power supply in series between the two poles, and controlling the power supply to generate an alternating current having a resonance frequency of the inductor and capacitor.

The details as well as other features and advantages of this invention are set forth in the remainder of the specification and are shown in the accompanying drawings.

DESCRIPTION OF THE PREFERRED EMBODIMENTS

Figure 1:
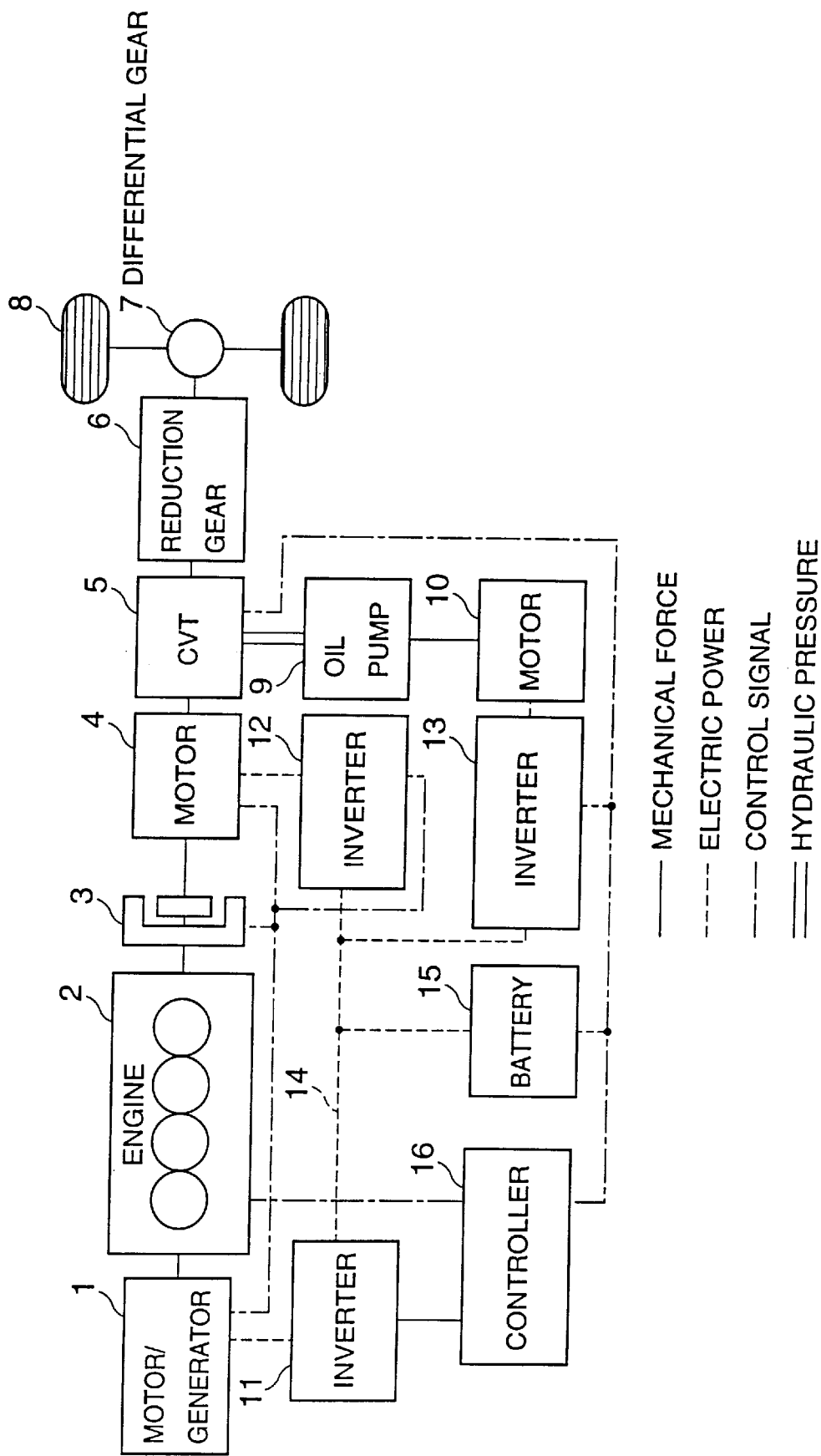
FIG. 1 is an schematic diagram of a hybrid vehicle according to this invention.

Referring to FIG. 1 of the drawings, a hybrid vehicle to which this invention is applied drives drive wheels 8 using the power of an engine 2 and motor 4.

The motor 4 is connected to an input shaft of a continuously variable transmission (CVT) 5.

The output shaft of the engine 2 is joined to a rotating shaft of the motor 4 via a clutch 3.

The output of the continuously variable transmission 5 is transmitted to the drive wheels 8 via a reduction gear 6 and a differential gear 7.

When the clutch 3 is engaged, therefore, the drive wheels 8 rotate due to a rotation torque of the engine 2 and motor 4, and when the clutch 3 is disengaged, the drive wheels 8 rotate due only to the rotation torque of the motor 4.

The continuously variable transmission 5 varies a speed ratio according to an oil pressure supplied from an oil pump 9 driven by a motor 10.

A motor/generator 1 is joined to the engine 2.

Due to a supply current from a battery 15, the motor/generator 1 functions as a starter motor for starting the engine 2, and functions as a generator to charge the battery 15 when the engine 2 is running.

The motor/generator 1 and motor 4, 10 are AC devices such as a triphase synchronous motor or triphase induction motor.

If a motor/generator is applied to the motor 4, electricity is generated by the rotation torque of the drive wheels 8 when the vehicle is slowing down, and a regenerative braking force based on the rotation resistance at this time may also be arranged to apply to the drive wheels 8.

The clutch 3 is an electromagnetic powder clutch which can regulate the transmission torque, but a dry type sheet clutch or wet type multiple disc clutch can also be used.

The motor/generator 1 and motor 4, 10 are respectively controlled by inverters 11, 12 and 13.

DC current motors may also be used for the motor/generator 1 and motor 44,10. In this case, DC/DC converters may be used instead of the inverters 11, 12 and 13.

The inverters 11, 12 and 13 are connected to the battery 15 via a common DC link 14.

The inverters 11, 12 and 13 convert DC power stored in the battery 15 to AC power, and supply this to the motor/generator 1 and motor 4,10.

The inverter 11 also converts AC power generated by the motor/generator 1 and charges the battery 15.

If the motor 4 performs regenerative braking as described above, the power generated by the motor 4 during regenerative braking may be used directly as a drive force for the DC motor 10 or motor/generator 1 via the DC link 14.

The rotation speed of the engine 2, transmission torque of the clutch 3, rotation speed of the motor/generator 1 and motor 4, 10, speed ratio of the continuously variable transmission 5 and charging/discharging of the battery 15 are respectively controlled by output signals from a controller 16.

The controller 16 comprises a microcomputer comprising a central processing unit (CPU), read only memory (ROM), random access memory (RAM) and input/output (I/O) interface.

Figure 2:
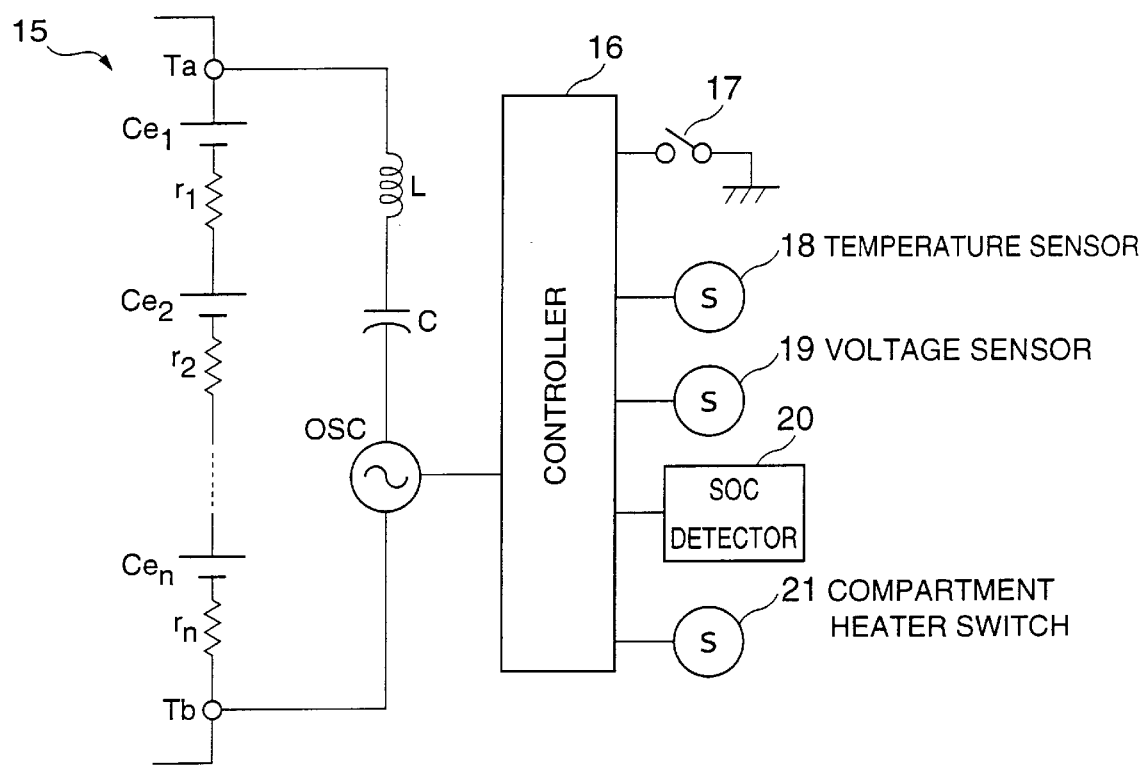
FIG. 2 is a circuit diagram of a battery temperature increasing device according to this invention.

Referring to FIG. 2 of the drawings, detection signals are input into the controller 16 from a vehicle key switch 17, temperature sensor 18 which detects a temperature TB of a battery 15, voltage sensor 19 which detects a terminal voltage VB of the battery 15, SOC detector 20 which detects the charge amount or state of charge SOC of the battery 15, and a vehicle compartment heater switch 21. The battery 15 comprises n cells $Ce_1$–$Ce_n$ connected in series.

Each cell $Ce_n$ has an internal-resistance $r_1$–$r_n$ (where n is a positive integer), and their combined R is expressed by the following formula.

$$R = \sum_{i=1}^{n} ri$$

An inductor L, capacitor C and alternator OSC are connected between terminals Ta, Tb of the battery 15, and form part of a temperature increasing circuit of the battery 15 together with the internal resistances $r_1$–$r_n$ of the cells $C_1$–$C_n$. The inductance of the inductor L will be referred to as L [H] for convenience, and the capacitance of the capacitor will be referred to as C [F] for convenience.

The alternator OSC generates alternating current of angular frequency ω [rad/sec] according to the output of the controller 16. The composite internal resistance R of the battery 15, inductor L and capacitor C of the temperature increase circuit form a series resonance circuit, and its resonance angular frequency $\omega_0$ is expressed by the following equation.

$$\omega_0 = \frac{1}{2\pi \cdot \sqrt{L \cdot C}}$$

If the angular frequency ω of the alternator OSC is set to the resonance angular frequency $\omega_0$ of the temperature increase circuit, a series resonance will occur in the temperature increase circuit, and an alternating current i will flow. Consequently, the internal resistance $r_n$ of each cell $C_n$ generates heat $W_n$ expressed by the following equation.

$$W_n = i^2 \cdot r_n$$

The heat W generated by the whole battery is expressed by the following equation.

$$W = i^2 \cdot R$$

A temperature TB of the battery 15 rises due to this heat W, and the electric discharge capacity increases.

When the temperature TB of the battery 15 is low, the internal resistance R is large, and the impedance of the inductor L and capacitor C when resonance occurs is low compared to the internal resistance R.

Therefore, most of the power consumption of the temperature increase circuit during resonance occurs in the internal resistance R (=$\Sigma r_n$), and appears as heat.

That is, when resonance occurs, almost all power consumption occurs inside the battery 15, and the battery temperature TB rises due to generation of heat.

On the other hand, if power is supplied to an external resistance load, etc., to perform coercive electric discharge and raise the temperature of the battery, the power consumed by the external load is larger than the power consumed due to internal resistance, the heat generated by the battery 15 itself is small, and the temperature increase effect is small relative to the amount of power consumption.

Now, when resonance is made to occur in the temperature increase circuit, an AC voltage V is applied to both terminals of each of the cells $C_n$ of the battery 15.

Figure 3:
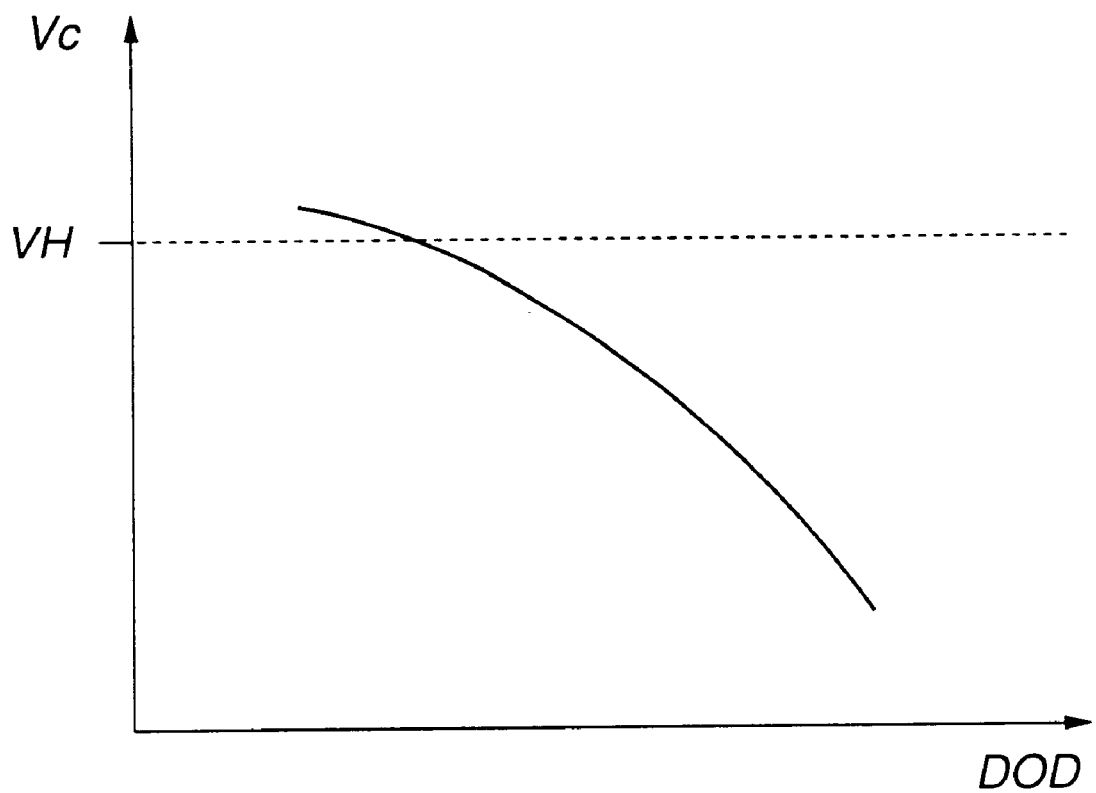
FIG. 3 is a diagram describing the relation of electric discharge depth DOD and cell voltage Vc of a manganese-spinel system lithium ion battery applied to this invention.

Usually, an upper limiting voltage VH of the cell voltage Vc is set to prevent early deterioration of the cell, as shown in FIG. 3. Therefore, the peak value of the AC voltage V due to resonance must not exceed this maximum value VH. For this purpose, the controller 16 increases or decreases the amplitude of the alternating current output from the alternator OSC increases and decreases according to the terminal voltage VB of the battery 15, that is, the amplitude is decreased the higher the terminal voltage VB. The upper limiting voltage VH is for example set to be 4.1V.

In this way, the voltage Vc applied to the battery 15 during resonance is limited to below the maximum value VH, and the life of the battery 15 is increased.

Figure 4:
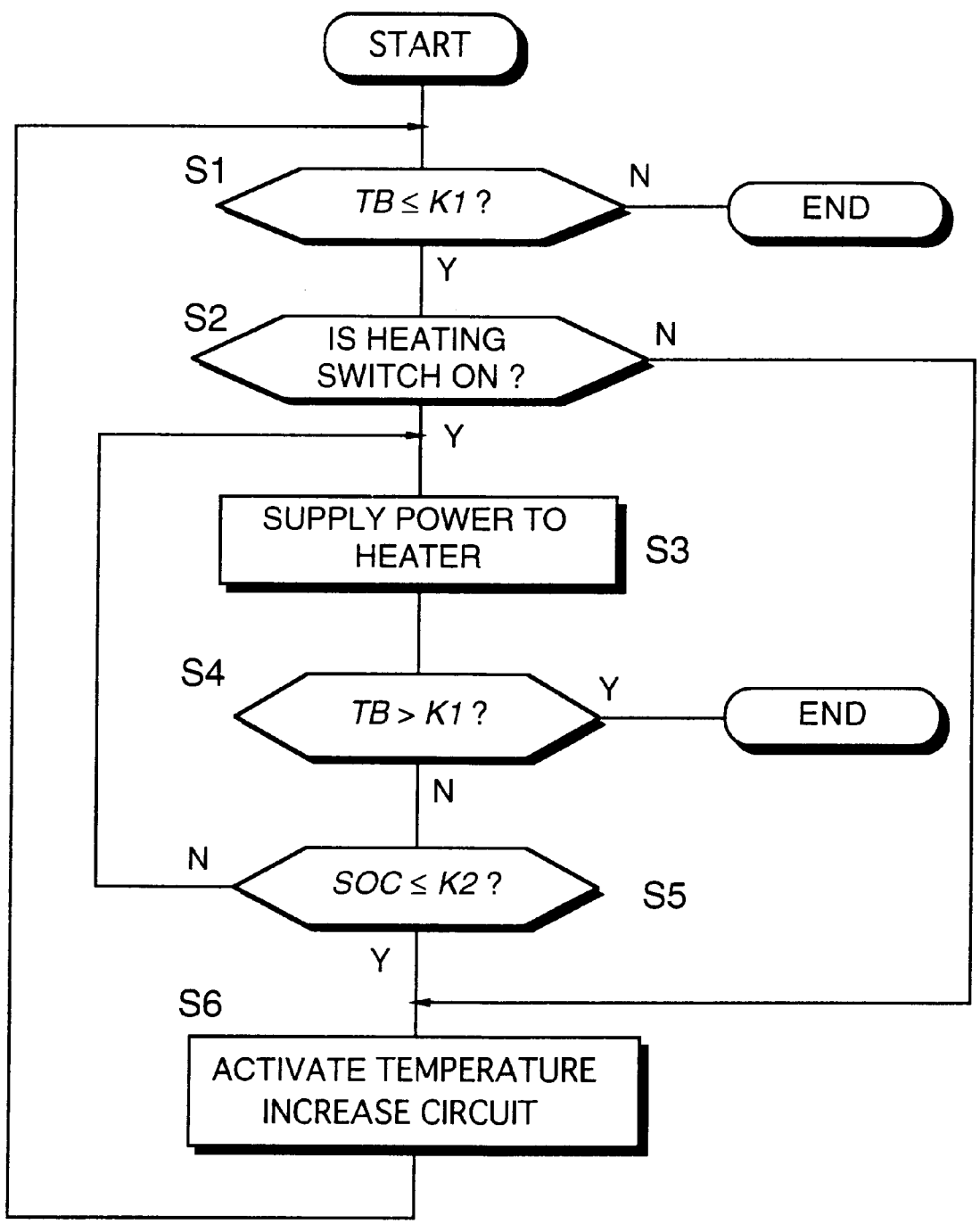
FIG. 4 is a flowchart describing a temperature increase control process performed by the battery temperature increasing device according to this invention.

Next, referring to FIG. 4, the battery temperature increasing process performed by the controller 16 will be described.

The controller 16 performs this process when the vehicle key switch 17 is turned on.

In a step S1, it is determined whether or not the temperature TB of the battery 15 detected by the temperature sensor 1 is equal to or less than a predetermined value K1.

When the battery temperature TB is higher than the predetermined value K1, it is determined that a temperature increasing operation does not need to be performed, and the process is terminated. The predetermined value K1 is for example set to be 0° C.

When the battery temperature TB is equal to or less than the predetermined value K1, in a step S2, it is determined whether or not the heating switch 21 in the vehicle compartment is ON.

If the heating switch 21 is ON, the routine proceeds to a step S3, power is applied to a heater, not illustrated, from the battery 15, and the vehicle compartment is heated.

Due to the current flowing from the battery 15 to the heater, the battery 15 generates heat due to its internal resistance $r_n$, and the temperature of the battery 15 rises. In this case, in a step S4, it is determined whether or not the battery temperature TB exceeded the predetermined value K1, and if it did exceed the predetermined value K1, the routine is terminated.

When it is determined that the battery temperature TB is equal to or less than the predetermined value K1, the routine proceeds to a step S5, and it is determined whether or not the charge amount SOC of the battery 15 detected by an SOC detecting device 20 is less than a predetermined value K2.

As mentioned above, the temperature increase effect of the battery due to coercive discharge to an external load is not very high, so when the SOC has fallen to or below the predetermined value K2, it is necessary to promptly raise the temperature TB of the battery 15 to increase its discharge capacity.

Therefore, when the SOC is equal to or less than the predetermined value K2, an alternating current of resonance frequency $\omega_0$ is output from the alternator OSC in a step S6, and series resonance is generated in the temperature increase circuit as described above. At that time, the alternating current i which flows to the temperature increase circuit is controlled according to the terminal voltage VB of the battery 15 detected by the voltage sensor 19 so that the cell voltage Vc is equal to or less than the upper limiting value VH. After operating the temperature increasing circuit in this manner, the routine repeats the processing from the step S1.

On the other hand, if it is determined that SOC is larger than the predetermined value K2 in the step S5, the routine returns to the step S3, and the power supply to the heater is continued. The predetermined value K2 is for example set to be 70%.

The contents of Tokugan Hei 10-132182, with a filing date of May 14, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, according to the above embodiment, the battery temperature increasing device is applied to a hybrid vehicle, but this invention may be applied to various kinds of electric vehicle including hybrid vehicles having a different drive system from that of this embodiment. It may also be applied to batteries other than those in electric vehicles.

Moreover, according to the above embodiment, a heating device was set as an external load, but the external load which performs coercive electric discharge is not limited to a heater.

The embodiments of this invention in which an exclusive property or privilege is claimed are defined as follows:

What is claimed:

1. A temperature increasing device for increasing the temperature of a battery comprising a positive and negative pole, and plural cells connected in series, said device comprising:

a circuit comprising an inductor, capacitor and alternating current power supply connected in series between said two poles, and a microprocessor programmed to control said alternating current power supply so that an alternating current having a resonance frequency of said inductor and capacitor is generated by said power supply.

2. A temperature increasing device as defined in claim 1, wherein said microprocessor is further programmed to control the amplitude of said alternating current so that a voltage of each of said cells is equal to or less than a preset upper limiting voltage.

3. A temperature increasing device as defined in claim 1, wherein said microprocessor is further programmed to control said battery to supply power to an external load connected to said poles so as to coercively discharge said battery when the charge amount of said battery is greater than a predetermined value, and to control said power supply to generate said alternating current when said charge amount is equal to or less than said predetermined value.

4. A temperature increasing device as described in claim 3, wherein said battery comprises a battery for driving an electric vehicle, and said external load comprises a heater which heats a vehicle compartment of said electric vehicle.

5. A temperature increasing device for increasing the temperature of a battery comprising a positive and negative pole, and plural cells connected in series, said device comprising:

a circuit comprising an inductor, capacitor and alternating current power supply connected in series between said two poles, and means for controlling said alternating current power supply so that an alternating current having a resonance frequency of said inductor and capacitor is generated by said power supply.

6. A temperature increasing method for increasing the temperature of a battery comprising a positive and negative pole, and plural cells connected in series, said method comprising:

connecting a circuit comprising an inductor, capacitor and alternating current power supply in series between said two poles, and controlling said power supply to generate an alternating current having a resonance frequency of said inductor and capacitor.

* * * * *